United States Patent
Patel et al.

(10) Patent No.: US 11,080,339 B2
(45) Date of Patent: Aug. 3, 2021

(54) SYSTEM AND METHOD FOR DISCOVERY AND RETRIEVAL USING AN ENUMERATOR

(71) Applicant: Dell Products L.P., Hopkinton, MA (US)

(72) Inventors: Dharmesh M. Patel, Round Rock, TX (US); Rizwan Ali, Cedar Park, TX (US); Ravikanth Chaganti, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 8 days.

(21) Appl. No.: 16/588,045

(22) Filed: Sep. 30, 2019

(65) Prior Publication Data

US 2021/0097107 A1    Apr. 1, 2021

(51) Int. Cl.
*G06F 3/06*      (2006.01)
*G06F 16/909*    (2019.01)
*G06F 16/906*    (2019.01)

(52) U.S. Cl.
CPC ............ *G06F 16/909* (2019.01); *G06F 3/067* (2013.01); *G06F 3/0619* (2013.01); *G06F 3/0638* (2013.01); *G06F 16/906* (2019.01)

(58) Field of Classification Search
CPC ....... G06F 3/067; G06F 3/0638; G06F 3/0619
See application file for complete search history.

(56) References Cited

U.S. PATENT DOCUMENTS

2018/0373597 A1*  12/2018  Rana ................... G06F 16/907

* cited by examiner

*Primary Examiner* — Edward J Dudek, Jr.
(74) *Attorney, Agent, or Firm* — Chamberlain, Hrdlicka, White, Williams & Aughtry

(57) ABSTRACT

A data storage system includes storage and a global enumerator. The storage stores data chunks, object level metadata associated with portions of the data chunks, and chunk level metadata associated with respective data chunks. The global enumerator obtains a data access request that includes a metadata characteristic; in response to obtaining the data access request: matches the metadata characteristic to at least one of the data chunks based on at least one selected from a group consisting of the object level metadata and the chunk level metadata; and provides a response based on the at least one data chunk of the data chunks in response to the data access request.

17 Claims, 13 Drawing Sheets

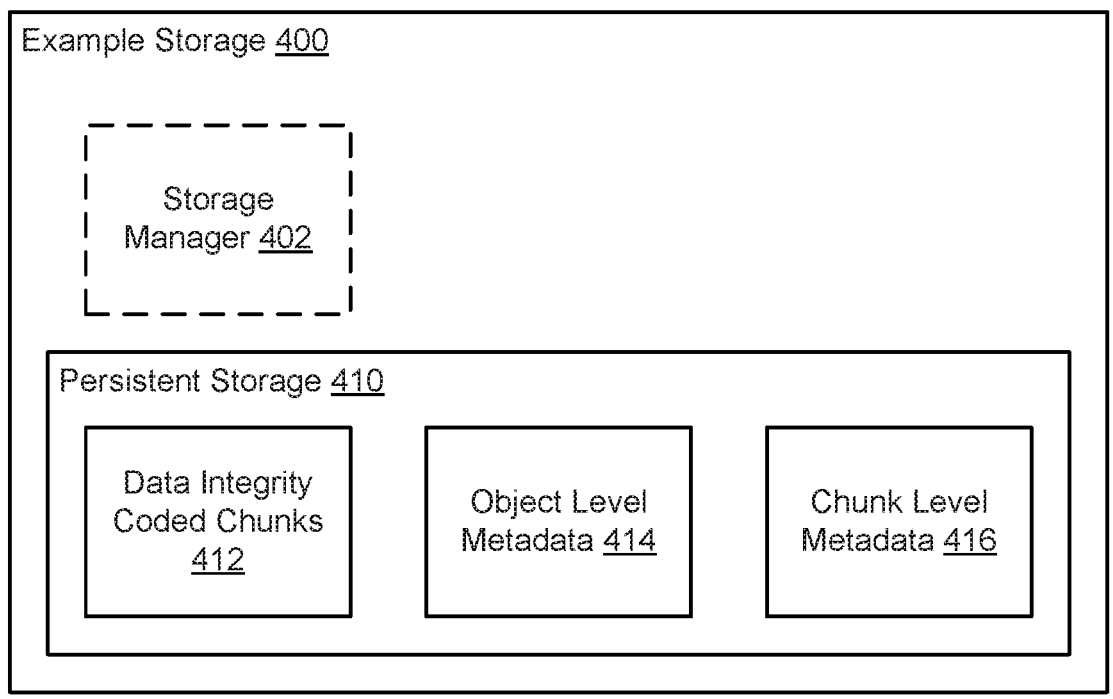
FIG. 4.1
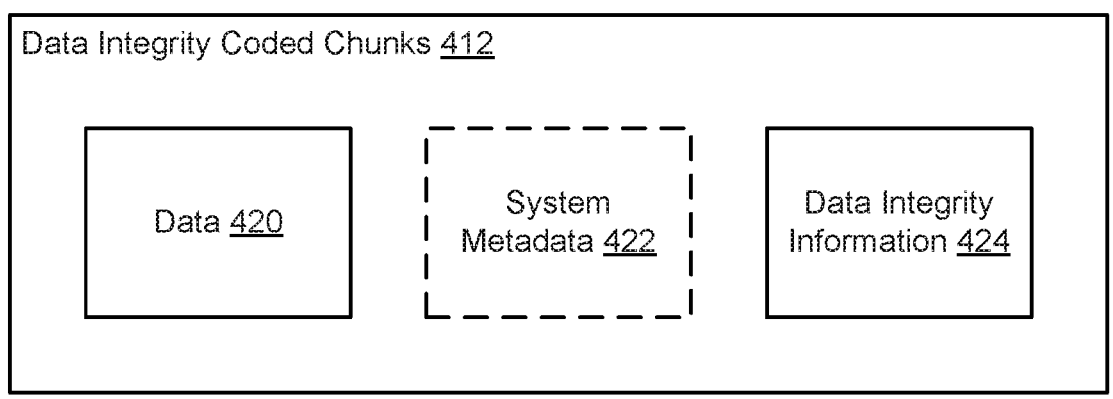
FIG. 4.2

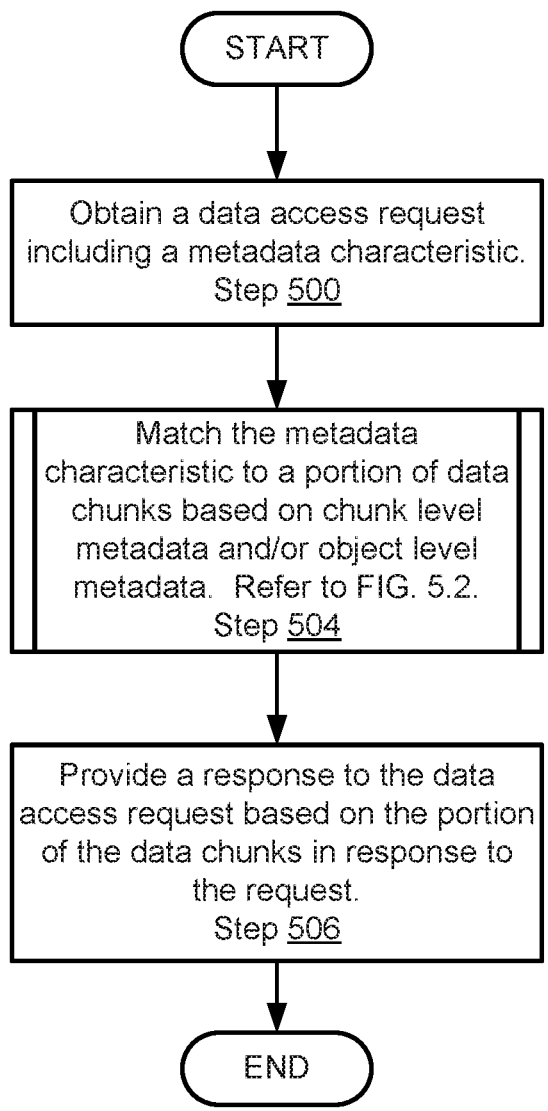
FIG. 5.1

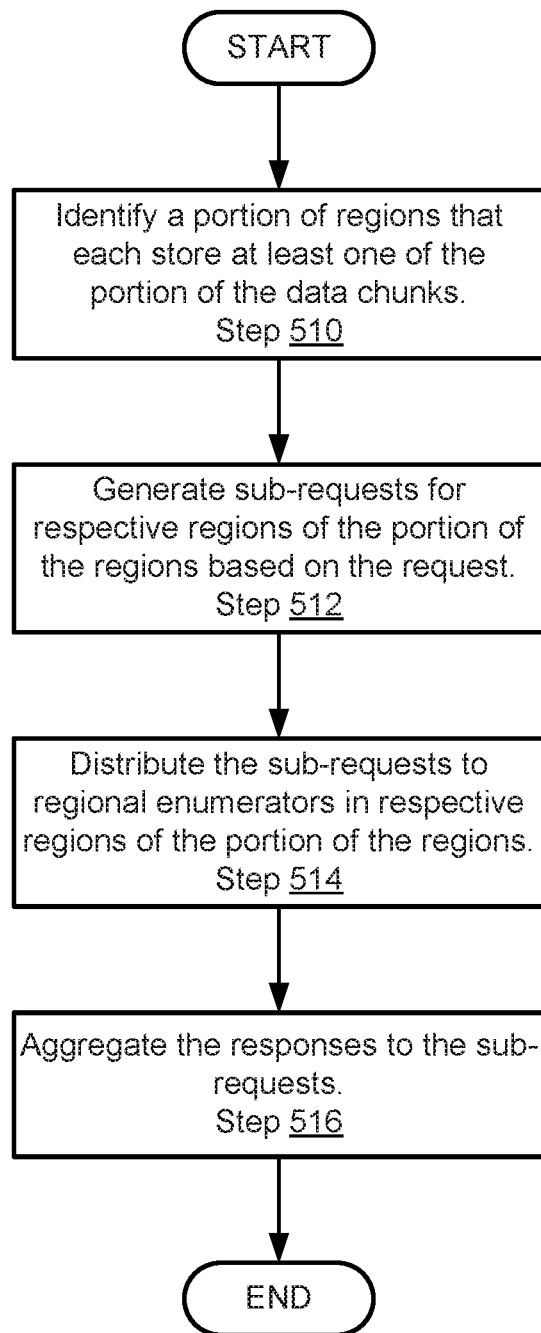
FIG. 5.2

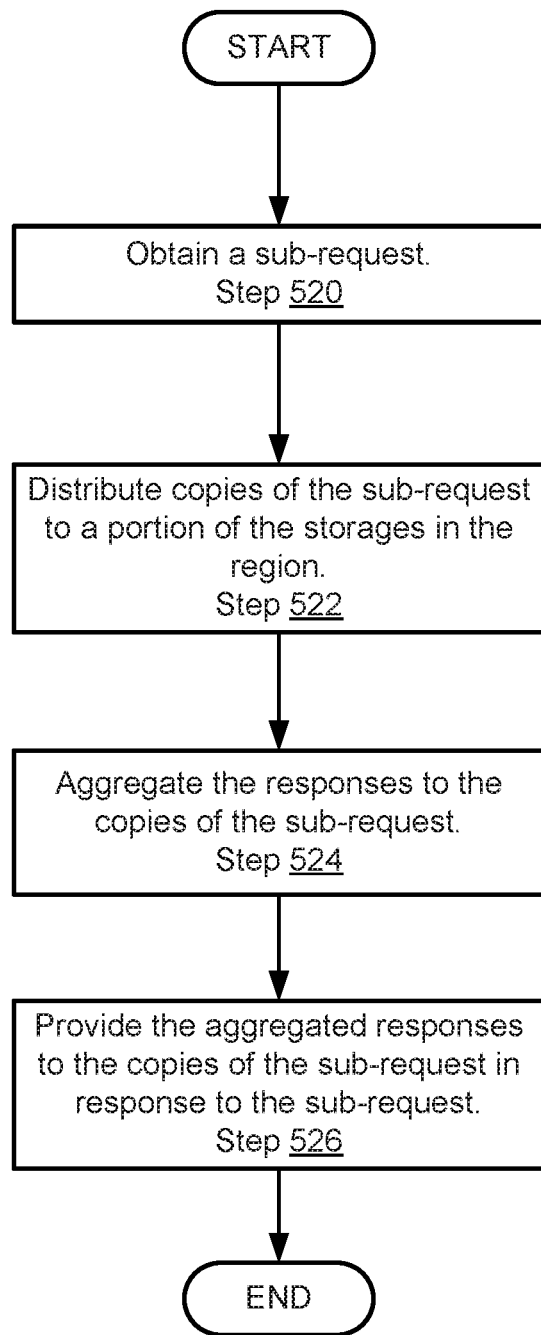
FIG. 5.3

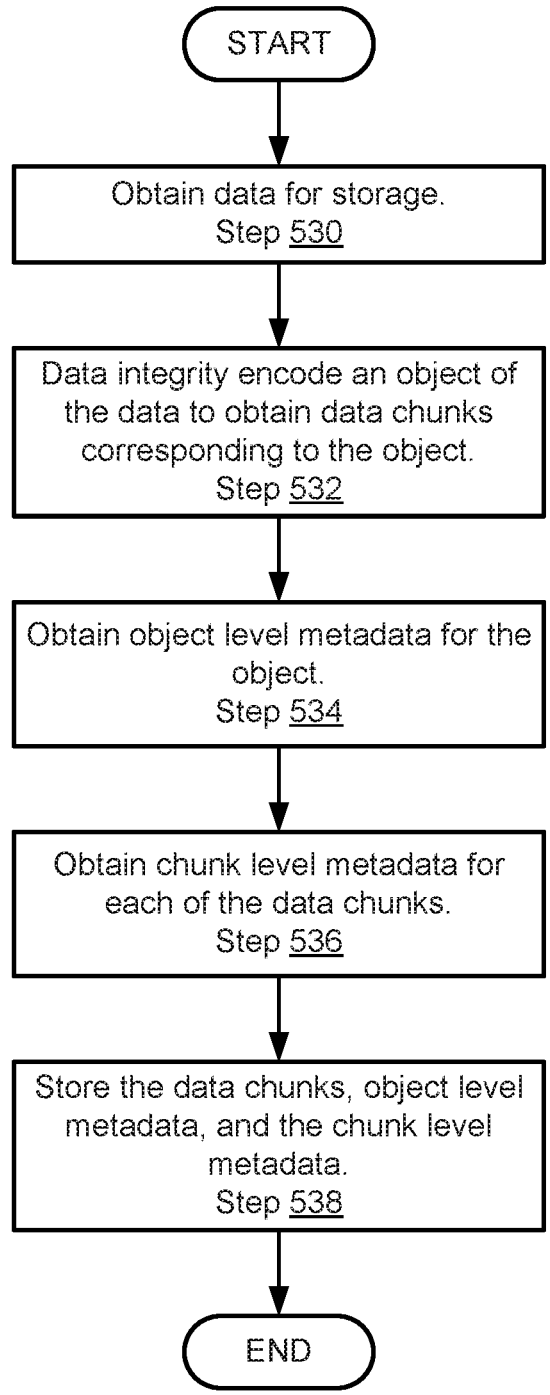
FIG. 5.4

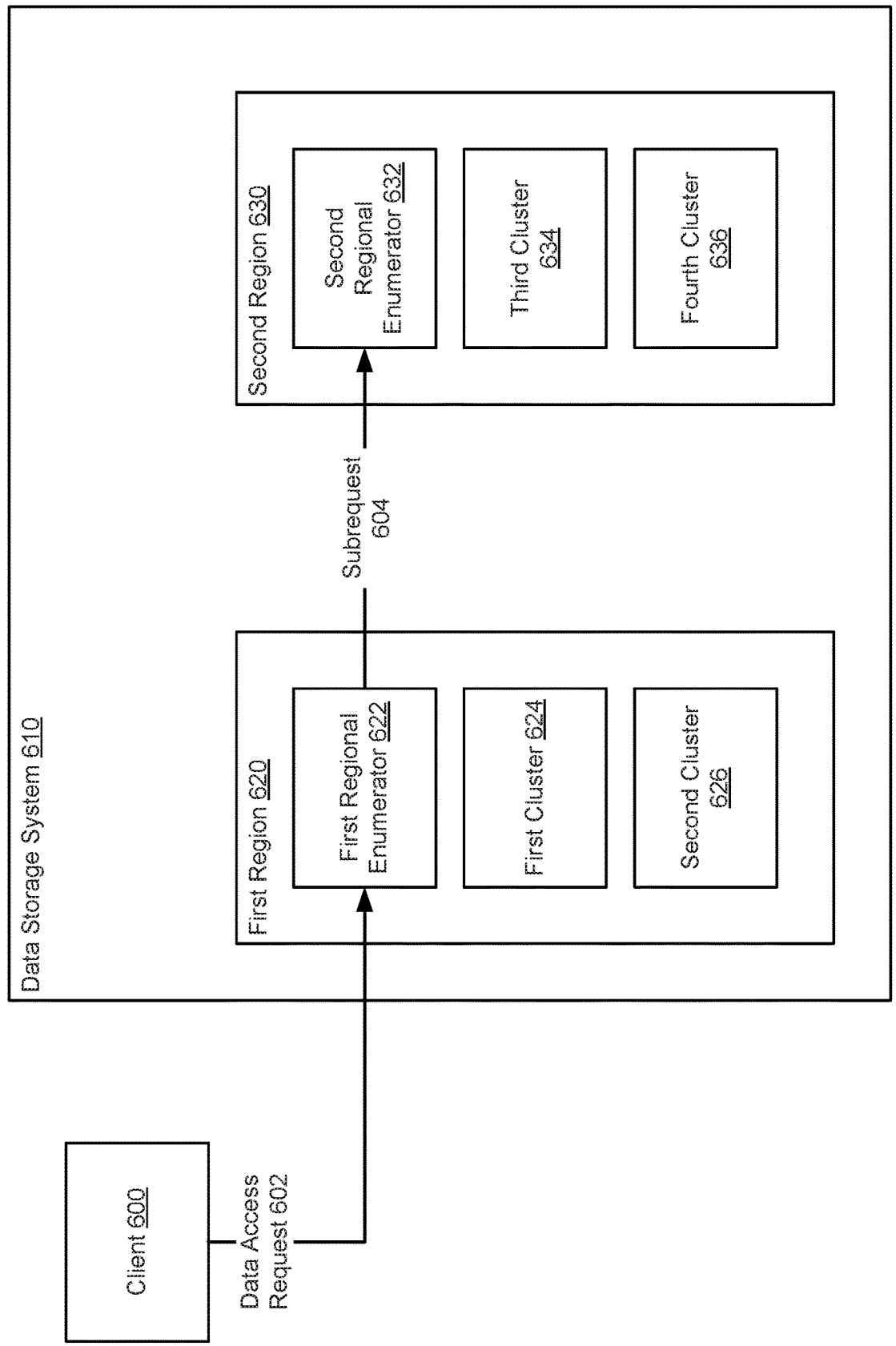
FIG. 6.1

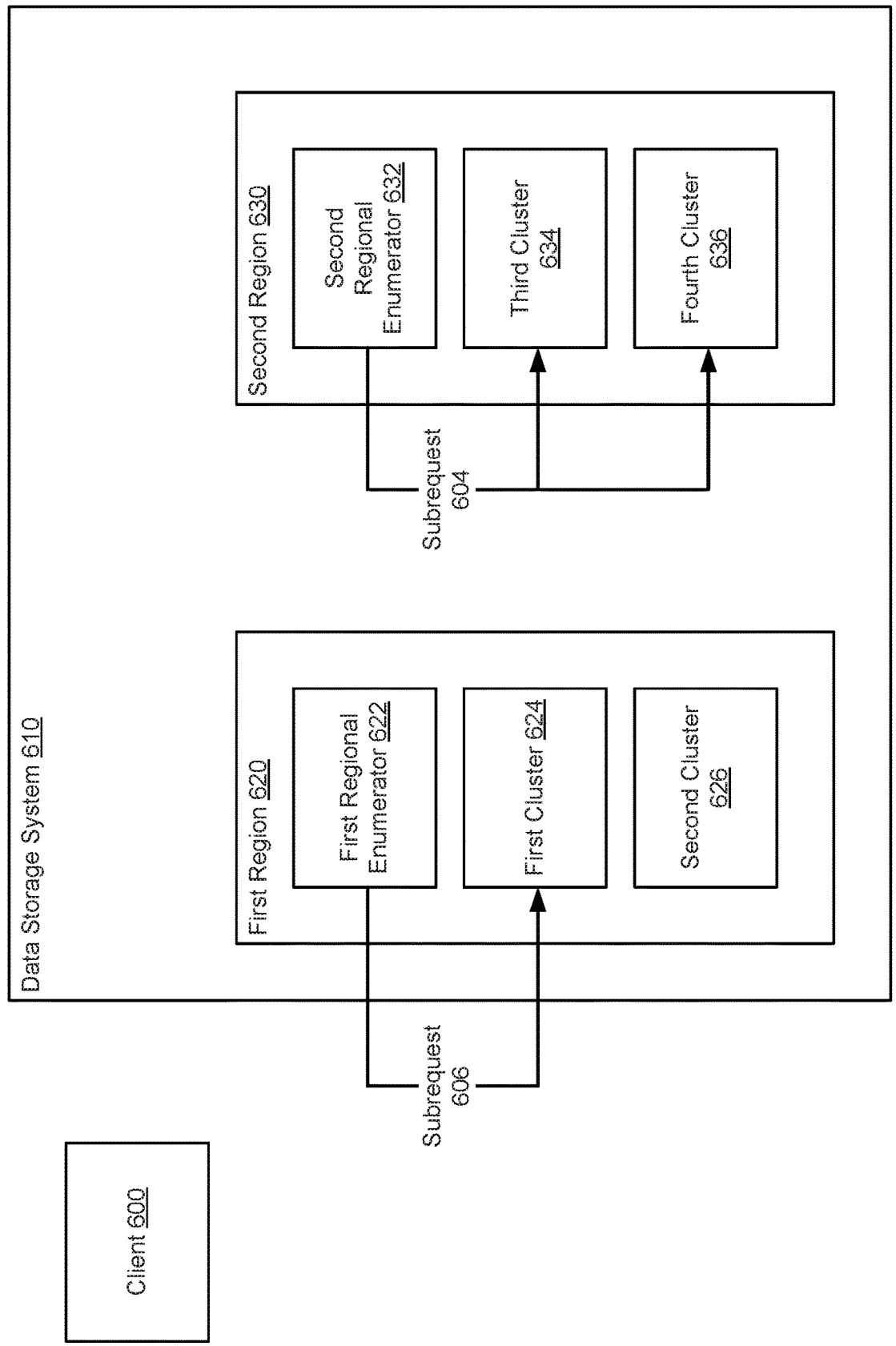
FIG. 6.2

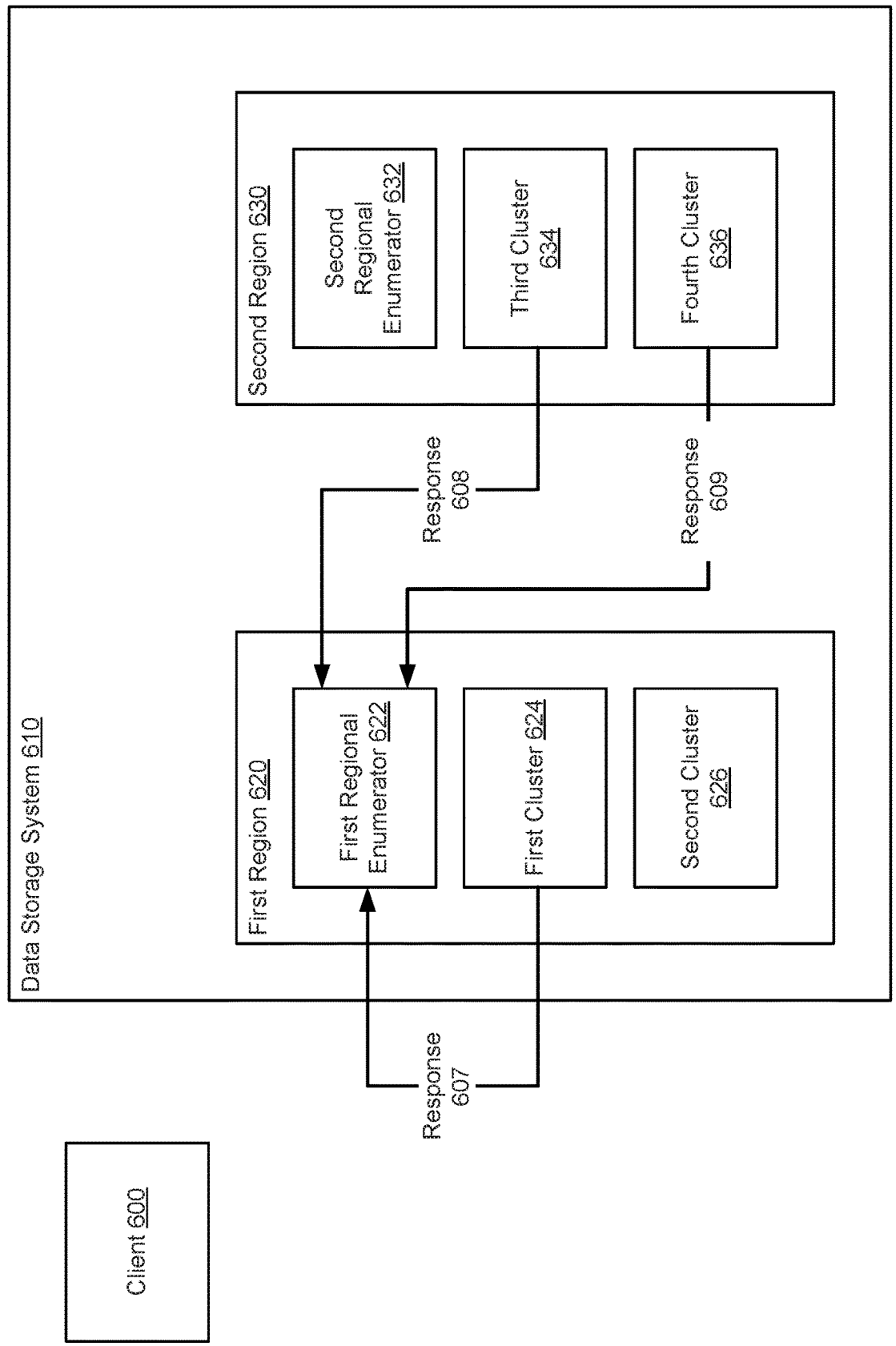
FIG. 6.3

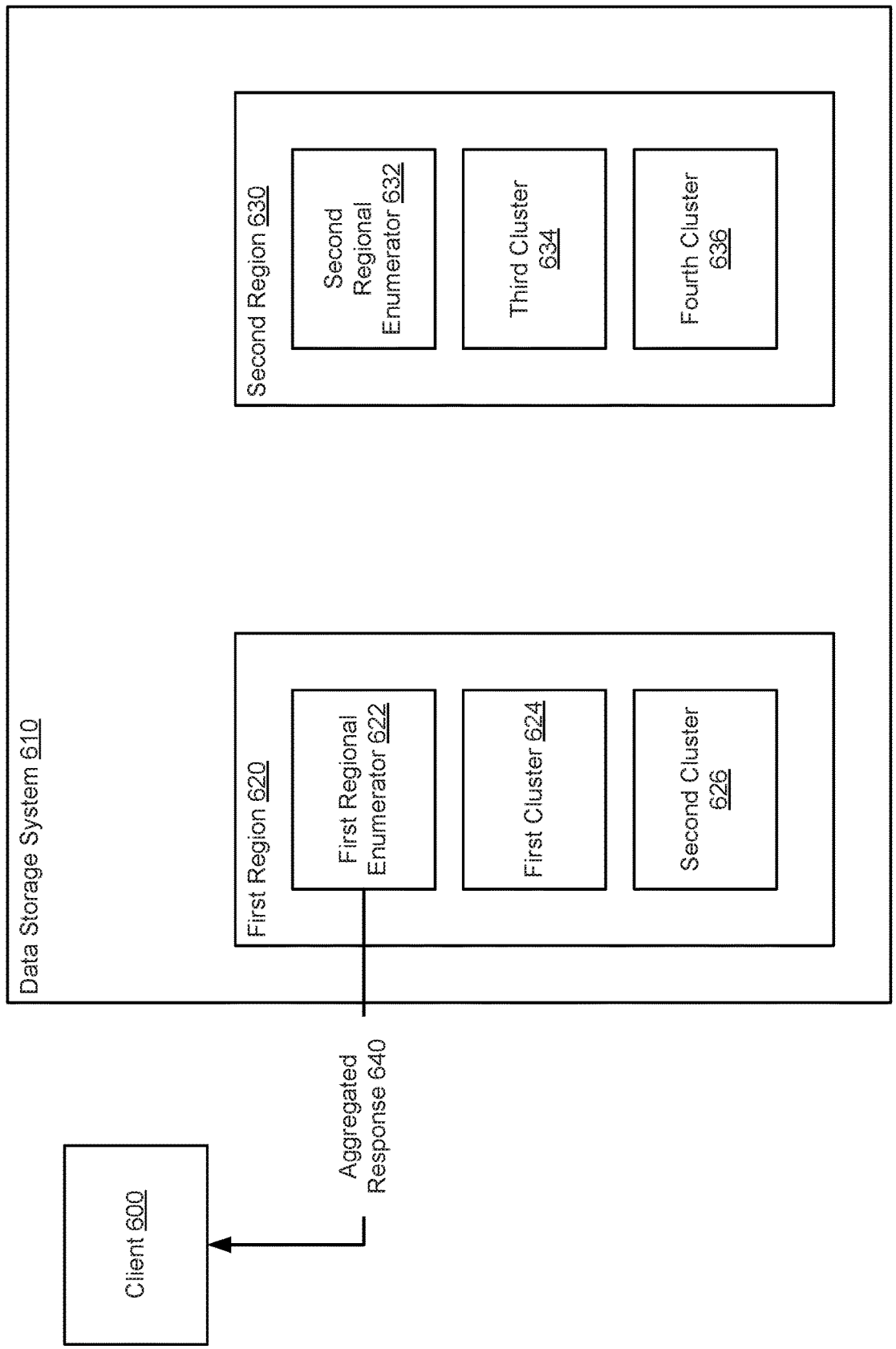
FIG. 6.4

… (US 11,080,339 B2)

SYSTEM AND METHOD FOR DISCOVERY AND RETRIEVAL USING AN ENUMERATOR

BACKGROUND

Computing devices may generate data during their operation. For example, applications hosted by the computing devices may generate data used by the applications to perform their functions. Such data may be stored in persistent storage of the computing devices. Failure of the persistent storage may result in data loss.

When data is lost, it may be unrecoverable if no copies of the data were made and stored in locations other than the persistent storage. If copies of data are stored in other locations, the data may be separated from an application that utilizes the data. Due to the format of the data, it may be difficult to ascertain the contents of the data without utilizing the application that uses the data.

SUMMARY

In one aspect, a data storage system in accordance with one or more embodiments of the invention includes storage and a global enumerator. The storage stores data chunks, object level metadata associated with portions of the data chunks, and chunk level metadata associated with respective data chunks. The global enumerator obtains a data access request that includes a metadata characteristic; in response to obtaining the data access request: matches the metadata characteristic to at least one of the data chunks based on at least one selected from a group consisting of the object level metadata and the chunk level metadata; and provides a response based on the at least one data chunk of the data chunks in response to the data access request.

In one aspect, a method for managing a data storage system in accordance with one or more embodiments of the invention includes obtaining a data access request comprising a metadata characteristic; in response to obtaining the data access request: matching the metadata characteristic to at least one data chunk of data chunks managed by the data storage system based on at least one selected from a group consisting of object level metadata and chunk level metadata, the object level metadata is associated with portions of the data chunks and the chunk level metadata is associated with respective data chunks; and providing a response, based on the at least one data chunk of the data chunks, in response to the data access request.

In one aspect, a non-transitory computer readable medium in accordance with one or more embodiments of the invention includes computer readable program code, which when executed by a computer processor enables the computer processor to perform a method for managing a data storage system, the method includes obtaining a data access request comprising a metadata characteristic; in response to obtaining the data access request: matching the metadata characteristic to at least one data chunk of data chunks managed by the data storage system based on at least one selected from a group consisting of object level metadata and chunk level metadata, the object level metadata is associated with portions of the data chunks and the chunk level metadata is associated with respective data chunks; and providing a response, based on the at least one data chunk of the data chunks, in response to the data access request.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

FIG. 4.1 shows a diagram of an example storage in accordance with one or more embodiments of the invention.

FIG. 4.2 shows a diagram of data integrity coded chunks in accordance with one or more embodiments of the invention.

FIG. 5.1 shows a flowchart of a method of servicing a data access request in accordance with one or more embodiments of the invention.

FIG. 5.2 shows a flowchart of a method of matching metadata characteristics in accordance with one or more embodiments of the invention.

FIG. 5.3 shows a flowchart of a method of servicing a sub-request in accordance with one or more embodiments of the invention.

FIG. 5.4 shows a flowchart of a method of storing data in accordance with one or more embodiments of the invention.

FIGS. 6.1-6.4 show diagrams of an example system at different points in time.

DETAILED DESCRIPTION

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

In general, embodiments of the invention relate to systems, devices, and methods for managing data. Specifically, the system may provide methods of storing data in a manner that enables the data to be efficiently searched without crawling the data. To do so, the system may store metadata associated with each chunk of the data that may be searched. The metadata associated with each chunk of the data may include relevant characteristics of the chunk of the data that may be desirable to search. Object level metadata may also be stored that is associated with any number of chunks of the data. The chunk and object level metadata may enable the data to be searched for particular characteristics specified by the chunk and object level metadata.

Further embodiments of the invention may provide a system that enables data stored in any number of regions to be efficiently searched. To enable efficient searching of the data, both global and regional enumerator services may be provided that are keyed to the object and/or chunk level metadata. By doing so, a distributed architecture that enables data stored across any number of regions to be searched may be provided.

Figure 1:
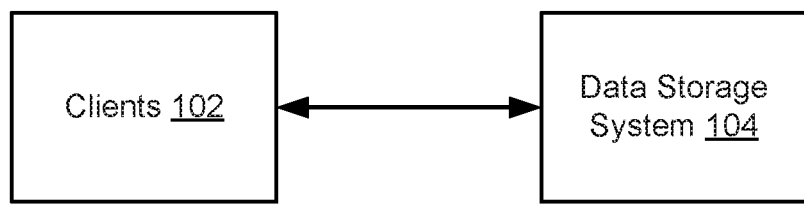
FIG. 1 shows a diagram of a system in time in accordance with one or more embodiments of the invention.

FIG. 1 shows a diagram of an example system in accordance with one or more embodiments of the invention. The system may facilitate the storage and searching of stored data. The system may include clients (102) and a data storage system (104).

The clients (102) may utilize data management services provided by the data storage system (104). Utilizing the data management services may include storing data in the data storage system (104) and/or obtaining data (or information regarding stored data) stored in the data storage system (104).

For example, the clients (102) may utilize the data storage system (104) to store data. Storing the data in the data storage system (104) may, for example, improve redundancy by storing a replica of data stored in the clients (102) in the data storage system (104), reduce the use of storage resources of the clients (102) by storing data in the data storage system (104) that would otherwise consume the clients' storage resources, or otherwise provide advantages to the clients (102).

The components of the system of FIG. 1 may be operably connected to each other (and/or other components) via any combination of wired and/or wireless networks. Each components of the system of FIG. 1 is discussed below.

The clients (102) may be implemented using computing devices. The computing devices may be, for example, mobile phones, tablet computers, laptop computers, desktop computers, servers, or cloud resources. The computing devices may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to perform the functions described in this application and/or all, or a portion, of the methods illustrated in FIGS. 5.1-5.4. The clients (102) may be implemented using other types of computing devices without departing from the invention. For additional details regarding computing devices, refer to FIG. 7.

The clients (102) may be implemented using logical devices without departing from the invention. For example, the clients (102) may be implemented using virtual machines that utilize computing resources of any number of physical computing devices (e.g., refer to FIG. 7) to provide their respective functionalities. The clients (102) may be implemented using other types of logical devices without departing from the invention.

In one or more embodiments of the invention, the clients (102) provide any number of computer implemented services. The computer implemented services may include, for example, file storage services, database services, electronic communication services, etc. The clients may provide other types of computer implemented services without departing from the invention. Each of the clients (102) may provide similar and/or different computer implemented services.

When providing computer implemented services, the clients (102) may utilize data storage services provided by the data storage system (104). Utilizing the data storage services provided by the data storage system (104) may include (i) storing data in the data storage system, (ii) obtaining data stored in the data storage system, and/or (iii) identifying data stored in the data storage system (104) that is of interest to the clients (102). As will be discussed in greater detail below, when identifying data stored in the data storage system (104) that is of interest to the clients (102), the clients (102) may utilize an enumerator service provided by the data storage system (104).

To utilize the enumerator service, the clients (102) may send data access requests to the data storage system (104). The data access requests may include information that may be used by the data storage system (104) to discriminate a portion of the data that is of interest to the clients (102) from the other data stored in the data storage system (104).

In one or more embodiments of the invention, the information included in the data access requests matches specific types of information used by the enumerator service provided by the data storage system (104) to discriminate data stored in the data storage system (104). By including the specific types of information used by the enumerator service, the data stored in the data storage system (104) may be discriminated without needing to (i) crawl the data and/or (ii) use system metadata that was used by a file system (or other organizational structure) of another computing device that provided the data to the data storage system (104) for storage purposes to discriminate the portion of the data that is relevant to a data access request from all of the data stored in the data storage system (104).

The system of FIG. 1 may include any number of clients (102) without departing from the invention.

The data storage system (104) may be implemented using computing devices. The computing devices may be, for example, mobile phones, tablet computers, laptop computers, desktop computers, servers, or cloud resources. The computing devices may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to perform the functions described in this application and/or all, or a portion, of the methods illustrated in FIGS. 5.1-5.4. The data storage system (104) may be implemented using other types of computing devices without departing from the invention. For additional details regarding computing devices, refer to FIG. 7.

The data storage system (104) may be implemented using logical devices without departing from the invention. For example, the data storage system (104) may be implemented using virtual machines that utilize computing resources of any number of physical computing devices (e.g., refer to FIG. 7) to provide their respective functionalities. The data storage system (104) may be implemented using other types of logical devices without departing from the invention.

In one or more embodiments of the invention, the data storage system (104) provides data management services. Providing data management services may include (i) storing data, (ii) providing stored data, and/or (iii) enabling data stored in the data storage system (104) to be searched.

To store data, the data storage system (104) may obtain data, modify the data to improve the likelihood that the data will be accessible in the future, add object level and/or chunk level metadata to the data, and store the modified data, the object level data, and chunk level metadata in storage of the data storage system (104) (and/or in other locations). For example, when the data storage system (104) obtains data for storage, the data storage system (104) may erasure code the data for data integrity purposes and thereby obtain data chunks. The data storage system (104) may also generate object level metadata that is associated with a portion of the data that include the data of a respective object (e.g., a file). The data storage system (104) may further generate chunk level metadata associated with each of the respective chunks. The object level metadata and/or the chunk level metadata associated with the data may include information that enables, for example, the data chunks associated with an object to be retrieved from storage, different portions of the chunks to be discriminated from one another (e.g., enable a level of search functionality), and/or enable different data chunks to otherwise be treated differently for any number of purposes.

For example, the object level metadata and/or the chunk level metadata may include (i) an object identifier that identifies an object associated with one or more data chunks, (ii) a identifier of a storage location of a data chunk, (iii) an identifier of a geographic region in which a data chunk is stored, (iv) an identifier of a data integrity scheme (e.g., erasure coding) used to generate the data chunk or how to use the data chunk based on an applied data integrity scheme, (v) an indicator of whether the data chunk has been deduplicated and/or the number of copies of data that the data chunk represents for deduplication purposes, (vi) an identifier of a region in which the data chunk is stored, (vii) an identifier of a computing resource aggregation in which the data chunk is stored, (viii) an identifier of a data chunk that may be used to retrieve the data chunk, (ix) a classification identifier that specifies a type of data included in a data chunk, and/or (x) an identifier of an organization that has rights (e.g., an owner) in a data chunk. The object level metadata and/or the chunk level metadata may include additional, different, and/or less information without departing from the invention.

To provide the stored data, the data storage system (104) may obtain any number of data chunks corresponding to desired data, reconstitute the desired data using the data chunks, and provide the desired data. For example, data having a particular characteristic may be desirable to an entity. To provide the data, the data storage system (104) may search the object level metadata and/or the chunk level metadata to determine whether the corresponding data chunks have characteristics matching the particular characteristics desired by the entity. Any data chunks matching the aforementioned characteristics may be obtained and used to provide the desired data.

To enable data stored in the data storage system (104) to be searched, the data storage system (104) may generate object level metadata and/or chunk level metadata. The aforementioned metadata may specify a subset of the characteristics of data that is stored by the data storage system (104). By doing so, the aforementioned metadata may be searched to identify portions of the data chunks that meet particular search criteria without needing to crawl the data chunks. Consequently, searching the data using the object level metadata and/or chunk level metadata (rather than the data itself) may be computationally and/or time efficient. For additional details regarding the data storage system (104), refer to FIGS. 2-4.

While the system of FIG. 1 has been illustrated and described as including a limited number of specific components, a system in accordance with one or more embodiments of the invention may include additional, fewer, and/or different components without departing from the invention.

Figure 2:
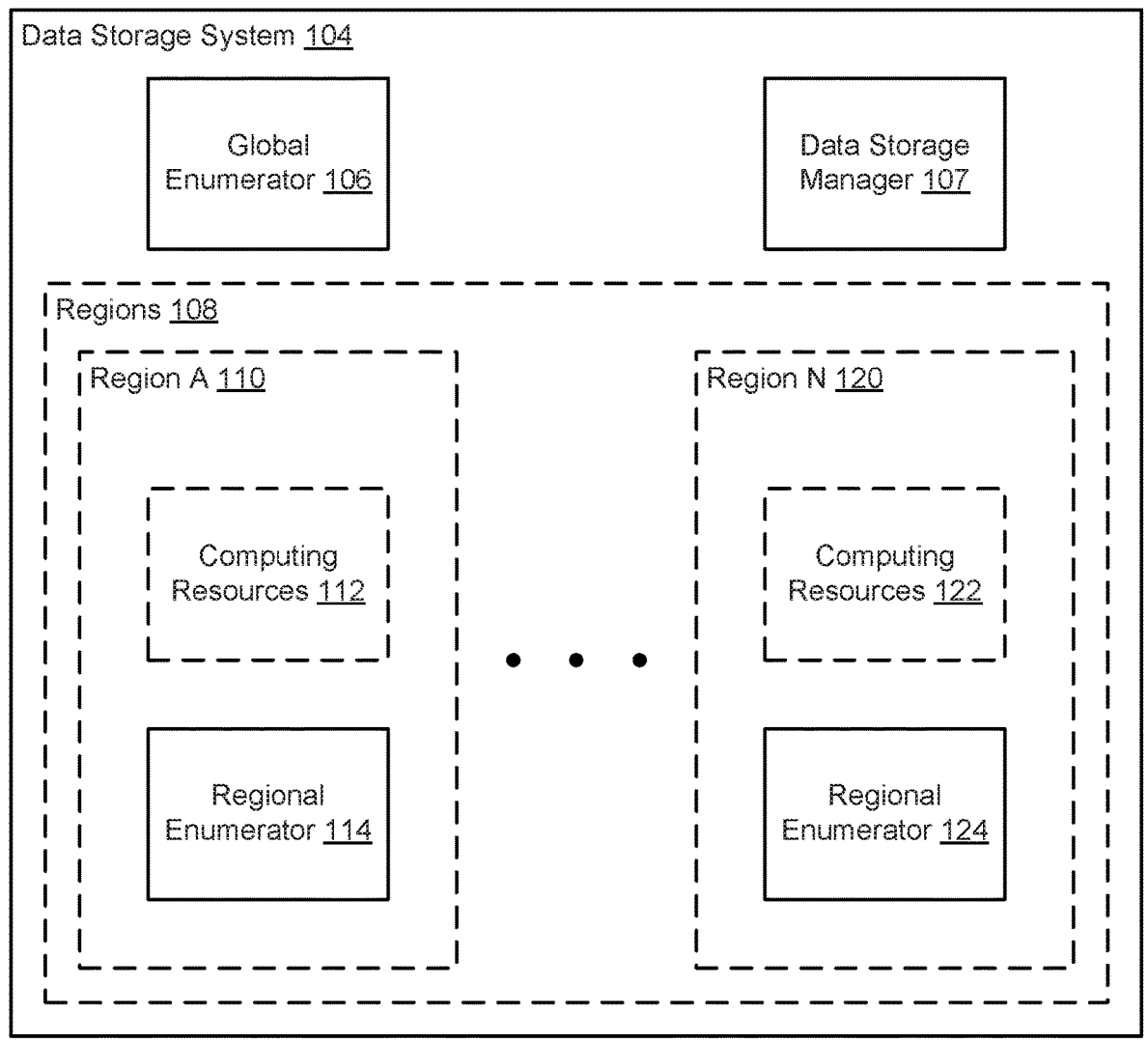
FIG. 2 shows a diagram of a data storage system in accordance with one or more embodiments of the invention.

As discussed above, a data storage system in accordance with one or more embodiments of the invention may provide data storage services to any number of clients and/or other entities. FIG. 2 shows a diagram of a data storage system (104) in accordance with one or more embodiments of the invention. As discussed above, the data storage system (104) may provide data management services to clients.

To provide data management services to the clients, the data storage system (104) may include a global enumerator (106), a data storage manager (107), and any number of regions (108). Each of these components of the data storage system (104) is discussed below.

The global enumerator (106) may provide search functionality and/or data retrieval functionality for data stored in the data storage system (104). For example, the global enumerator (106) may receive data access requests for data and service the aforementioned request. The data access request may be, for example, a request to provide data having a particular characteristic(s) or a request to provide information regarding data stored having the particular characteristic(s).

To service the data access requests, the global enumerator (106) include functionality to search object level metadata and/or chunk level metadata associated with data stored in the data storage system (104). To search the aforementioned metadata, the global enumerator (106) include functionality to generate sub-requests based on a data access request. The sub-request may be a data access request that has been customized for a particular region of the regions (108). The global enumerator (106) may generate any number of such sub-requests when servicing data access request.

For example, a data access request obtained by the global enumerator (106) may only implicate data stored in a subset of the regions (108). To service the aforementioned data access request, the global enumerator (106) may only generate sub-requests for each of the implicated regions. Once generated, the global enumerator (106) may send the aforementioned sub-requests to the corresponding regions. By doing so, only regions implicated by data access requests may receive sub-requests. Consequently, the total computing resources consumed for servicing a data access request may be reduced when compared to servicing a data access request by generating and sending sub-requests to all of the regions, even those that are unlikely to include data responsive to the data access request.

To generate such sub-requests, the global enumerator (106) may maintain a cache (not shown) or other type of data structure that includes a portion of the object level metadata and/or chunk level metadata maintained by the regions. For example, the global enumerator (106) may maintain a cache of the object level metadata included in each of the regions (108). By doing so, the global enumerator (106) may utilize the data included in the cache to determine which of the regions is likely to include data that is responsive to a data access request. By doing so, the global enumerator (106) may generate a customized set of sub-requests for each data access request (e.g., by identifying a subset of the regions based on the metadata included in the cache).

Once the sub-requests are generated, the global enumerator (106) may send the sub-requests to corresponding regions. More specifically, regional enumerators in each of the regions. In turn, regional enumerators may process the obtained sub-requests and provide data that is responsive to the sub-requests. The global enumerator (106) may aggregate the responsive data and provide the data (or information derived from the responsive data) in response to the data access request.

The global enumerator (106) may be implemented using computing devices. The computing devices may be, for example, mobile phones, tablet computers, laptop computers, desktop computers, servers, or cloud resources. The computing devices may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to perform the functions of the global enumerator (106) described in this application and/or all, or a portion, of the methods illustrated in FIGS. 5.1-5.4. The global enumerator (106) may be implemented using other types of computing devices without departing from the invention. For additional details regarding computing devices, refer to FIG. 7.

The global enumerator (106) may be implemented using logical devices without departing from the invention. For example, the global enumerator (106) may be implemented using virtual machines that utilize computing resources of any number of physical computing devices (e.g., refer to FIG. 7) to provide their respective functionalities. The global enumerator (106) may be implemented using other types of logical devices without departing from the invention.

The data storage manager (107) may provide data storage functionality. For example, the data storage manager (107) may obtain data for storage, encode the data for data reliability purposes (e.g., erasure code), generate object level and/or chunk level metadata, and store the data and/or the aforementioned metadata. When storing coded data, the data storage manager (107) may store the data across multiple fault domains in accordance with a data integrity scheme (e.g., erasure coding). The data storage manager (107) may also store the object level metadata and/or chunk level metadata in a searchable repository. By doing so, the regional enumerators may service sub-requests by searching the aforementioned metadata rather than the data chunks.

The data storage manager (107) may be implemented using computing devices. The computing devices may be, for example, mobile phones, tablet computers, laptop computers, desktop computers, servers, or cloud resources. The computing devices may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to perform the functions of the data storage manager (107) described in this application and/or all, or a portion, of the methods illustrated in FIGS. 5.1-5.4. The data storage manager (107) may be implemented using other types of computing devices without departing from the invention. For additional details regarding computing devices, refer to FIG. 7.

The data storage manager (107) may be implemented using logical devices without departing from the invention. For example, the data storage manager (107) may be implemented using virtual machines that utilize computing resources of any number of physical computing devices (e.g., refer to FIG. 7) to provide their respective functionalities. The data storage manager (107) may be implemented using other types of logical devices without departing from the invention.

While the global enumerator (106) and the data storage manager (107) are illustrated as entities separate from the regions (108), the regions (108) may provide the functionality of the global enumerator (106) and the data storage manager (107) without departing from the invention. For example, the regional enumerator in each of the regions may provide the functionality of the global enumerator (106) when a particular region (e.g., 110, 120) obtains a data access request. The aforementioned regional enumerator may provide the functionality of the global enumerator (106) in addition to its own functionality of the regional enumerator, which will be discussed in greater detail below. Similarly, each of the regions (108) may be separately hosting an instance of the data storage manager (107).

The regions (108) may be logical groupings of computing resources. The data storage system (104) may include any number of regions. The computing resources of each region may include any number of physical and/or logical computing devices. For details regarding a physical computing device, refer to FIG. 7. The computing resources (e.g., 112, 122) of each of the regions (e.g., 110, 120) may host a regional enumerator (e.g., 114, 124) and may provide data storage services. The data storage services provided by the computing resources (e.g., 112, 122) of each region may include storing of data, metadata, and provide copies of stored data and/or metadata. For additional details regarding computing resources, refer to FIG. 3.

As discussed above, the regional enumerators may service sub-requests obtained from the global enumerator (106). To service sub-requests, the regional enumerators (e.g., 114, 124) may obtain the requests, use object level metadata and/or chunk level metadata to identify any number (e.g., none, one, many) of data chunks that are responsive to the requests, and provide the responsive data chunks and/or information regarding the data chunks in response to the requests.

The regional enumerators may be implemented as physical and/or logical devices. For example, the regional enumerators may be implemented using computer readable instructions (e.g., program code) that when executed by the computing resources of a region give rise to the functionality of the regional enumerator. In another example, the regional enumerators may be implemented using special purpose hardware devices such as, for example, programmable gate arrays, application specific integrated circuit, or another type of hardware device that provides the functionality of the regional enumerators by including circuitry adapted to provide the aforementioned functionality. In a still further example, the regional enumerators may be implemented using a combination of computer readable instructions (e.g., program code) and special purpose hardware devices.

In some embodiments of the invention, the different regions of the regions (108) may correspond to logical groupings of computing resources that are disposed in different geographic regions. The geographic regions may, for example, correspond to different countries that place different data control restrictions on the storage and/or transmission of different types of data. Consequently, the computing resources disposed in each of the different regions (e.g., 110, 120) may be subject to different data control restrictions.

For example, the computing resources (112) of region A (110) may be disposed in the United States while the computing resources (122) of region N (120) may be disposed in Europe. Each of these geographic regions have different data control restrictions imposed by the local governments. Consequently, the governmental regulations that apply to data stored in the computing resources (112) of region A (110) may be different from those that apply to the data stored in the computing resources (122) of region N (120).

While the data storage system (104) has been described and illustrated as including a limited number of specific components, a data storage system (104) in accordance with embodiments of the invention may include additional, fewer, and/or different components.

Figure 3:
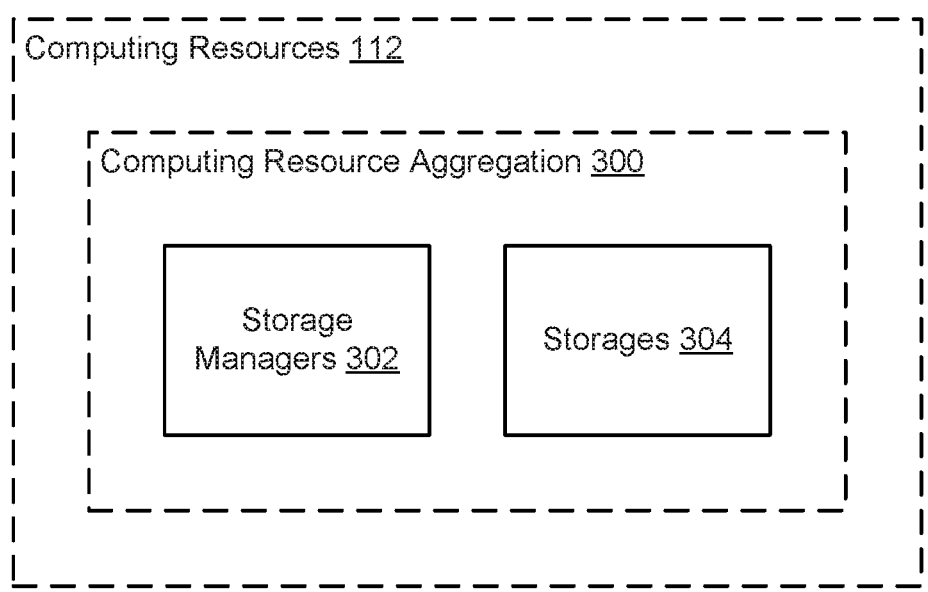
FIG. 3 shows a diagram of computing resources in accordance with one or more embodiments of the invention.

As discussed above, a region (e.g., 110, 120) may be a logical grouping of computing resources. The grouping may correspond to a geographic and/or regulatory boundary (e.g., all of the computing resources of a region may be subject to the same data control restrictions). FIG. 3 shows a diagram of computing resources (112) in accordance with one or more embodiments of the invention.

The computing resources (112) of a region may include any number of computing resource aggregations (e.g., 300) as illustrated in FIG. 3. A computing resource aggregation (300) in accordance with one or more embodiments of the invention may include any quantity of physical and/or logical computing resources.

For example, a computing resource aggregation (300) may be implemented as a computing cluster, a cloud resource (e.g., a logical entity that utilizes any quantity of computing resources of any number of physical computing devices), a hyperconverged architecture, a server farm, or any other type of grouping of computing resources. The physical and/or logical computing resources of the computing resource aggregation (300) may be adapted to provide the functionality of the computing resource aggregation (300). To be adapted to provide the functionality of the computing resource aggregation (300), the physical computing resources of the computing resource aggregation (300) may execute computer instructions (e.g., computer code) that cause processing devices of the computing resource aggregation (300) to provide all, or a portion, of the functionality of the computing resource aggregation (300). The physical computing resources may include dedicated circuitry that provides all, or a portion, of the functionality of the computing resource aggregation (300), and/or include/host other types of physical and/or logical entities that provide the functionality of the computing resource aggregation (300).

The computing resource aggregation (300) may provide data storage services. The data storage may include storing data and provide copies of stored data. To provide the functionality of the computing resource aggregation (300), the computing resource aggregation (300) may include one or more storage manager (302) and one or more storages (304). Each of the aforementioned components of the computing resources aggregation (300) is discussed below.

The storage managers (302) may manage storing of data in storage resources of the computing resource aggregation (300) and providing copies of data stored in the storage resources. For example, the storage managers (302) may store data in the storages (304) and provide data stored in the storages (304) in response to requests from regional enumerators and/or other entities.

To do so, the storage managers (302) may include functionality to generate data chunks, object level metadata, and chunk level metadata, as discussed above. To generate the data chunks, the storage managers (302) include functionality to encode data for data integrity purposes. For example, the storage managers (302) may include functionality to generate erasure coded data that includes any number of data and parity chunks.

For example, the storage managers (302) may include functionality to implement any number of erasure coding algorithms. The erasure coding algorithms implemented by the storage managers (302) may generate erasure coded data (e.g., data integrity coded chunks) corresponding to any erasure coding scheme (e.g., 3:1, 4:2, etc.). The storage managers (302) may include functionality to store the aforementioned data chunks across any number of fault domains for data integrity purposes.

Additionally, the storage managers (302) may include functionality to regenerate data in accordance with any number of erasure coding schemes (or other type of data integrity schemes). For example, the storage managers (302) may be capable of responding to failures of one or more of the storages (304) by regenerating any portion of the data stored in the failed one or more of the storages (304) in accordance with data integrity schemes employed by the storage managers (302).

For example, consider a scenario in which data chunks are erasure coded in a 3:1 manner and stored across four of the storages (304). In response to a failure of one of the four storages, the storage managers (302) may regenerate the data using the remaining data. Once regenerated, the regenerated data may be stored in another one of the storages (304).

In addition to erasure coding data for data integrity purposes, the storage managers (302) may implement any number of other data integrity algorithms such as, for example, mirroring.

The storage managers (302) may also store any number of copies of object level metadata and/or chunk level metadata. For example, the storage managers (302) may store copies of the aforementioned metadata and/or data in persistent storage (e.g., the storages (304)) and/or memory (i.e., an in-memory data structure).

The storage managers (302) may be implemented using any combination of physical and/or logical devices. For example, the storage managers (302) may be implemented using computer readable instructions (e.g., program code) that when executed by the computing resources of the computing resource aggregation (300) give rise to the functionality of the storage managers (302). In another example, the storage managers (302) may be implemented using special purpose hardware devices such as, for example, programmable gate arrays, application specific integrated circuit, or another type of hardware device that provides the functionality of the storage managers (302) by including circuitry adapted to provide the aforementioned functionality. In a still further example, the storage managers (302) may be implemented using a combination of computer readable instructions (e.g., program code) and special purpose hardware devices.

While the storage managers (302) are illustrated in FIG. 3 as being separate devices from that of the storages (304), the functionality of the storage managers (302) may be performed by the storages (304) without departing from the invention.

The computing resource aggregation (300) may include any number of storage managers (302). For example, the computing resource aggregation (300) may include more storages (304) than storage managers (302) (e.g., a storage manager utilizes the storage resources of multiple storages) or the same number of storage managers (302) as storages (304) (e.g., each storage manager utilizes only the storage resources of a corresponding storage). In some embodiments of the invention, two storages may utilize the storage resources of a single storage (e.g., different portions of the storage resources of the storage are utilized by different storage managers). In some embodiments of the invention, two storages may share a portion of the storage resources of a single storage (e.g., a shared storage resource).

The storages (304) may be implemented using physical or logical devices that provide storage resources that may be utilized by the storage managers (302) and/or other entities. For example, the storages (304) may be implemented using physical (e.g., hard disk drives, solid state drives, etc.) or logical storages (e.g., virtual disks). By proving storage resources to the storage managers (302), the storage managers (302) may be able to store data using the storage resources and provide copies of stored data using the storage resources.

In one or more embodiments of the invention, all, or a portion, of the storages (304) are implemented as computing accelerated storage devices. A computing accelerated storage device may be a storage device that includes the ability to execute algorithms (e.g., includes processing/memory resources to execute computer instructions and/or includes a hardware device that includes dedicated circuitry that provides the functionality of the algorithms) to facilitate storing of data in persistent storage of the computing accelerated storage device. For example, a computing accelerated storage device may include processing resources, memory resources, and may store computer instructions that when executing using the processing resources and/or memory resources causes the computing accelerated storage device to perform one or more algorithms. The one or more algorithms may correspond to all, or a portion, of the functionality of the storage managers (302).

Implementing the storages (304) using computing accelerated storage devices may enable the computing resource aggregation (300) to perform distributed algorithms, at the storage level, in a coordinated manner to provide its functionality. Doing so may free the computing resources of devices hosting the storages (304) to perform other types of functionality of the computing resource aggregation (300).

While the computing resources (112) have been described as including a limited number of specific components, the computing resources (112) may include additional, different, and/or fewer components without departing from the invention.

As discussed above, a data storage system in accordance with embodiments of the invention may store data in a format (i.e., a data structure) that enables stored data to be searched for particular characteristics without resorting to crawling the stored data, which may be computationally expensive. To further clarify aspects of the format of stored data in accordance with embodiments of the invention, FIGS. 4.1-4.2 show a diagram of an example storage (400) that stores data in a particular format and a diagram of a data structure, respectively.

FIG. 4.1 shows a diagram of an example storage (400) in accordance with embodiments of the invention. The example storage (400) may be similar to the storages (304) illustrated in FIG. 3. As discussed with respect to the storages (304) of FIG. 3, the example storage (400) may provide all, or a portion, of the functionality of a storage manager (402) corresponding to one of the storage managers illustrated in FIG. 3.

The storage manager (402) may include functionality to perform any number of algorithms related to storing data in persistent storage (410) of the example storage (400) and providing data stored in the persistent storage (410). For example, the storage manager (402) may include functionality to store data in an erasure coded format (or other type of data integrity storage format), search object level metadata and/or chunk level metadata, modify an erasure coding format of stored data, store data in other storages (e.g., to meet fault domain or other restrictions related to data integrity schemes employed for data storage purposes), and/or other functionalities.

When providing its functionality, the storage manager (402) may generate, store, and/or utilize previously stored data integrity coded chunks (412), object level metadata (414), and/or chunk level metadata (416) in persistent storage.

To store data, the example storage (400) may include persistent storage (410). The persistent storage (410) may provide storage resources. To provide storage resources, the persistent storage (410) may include any number of physical devices for storing data. For example, the persistent storage (410) may include hard disk drives, solid state drives, tape drives, or any other type of physical storage devices that provides non-transitory storage resources. The persistent storage (410) may also include transitory storage resources such as, for example, memory for temporarily storing data until the data is able to be stored in non-transitory storage resources.

The persistent storage (410) may store data integrity coded chunks (412), object level metadata (414), and chunk level metadata (416). Each of these data structures are discussed below.

The data integrity coded chunks (412) may be data structures that include information reflecting data (420), system metadata (422), and data integrity information (424), as illustrated in FIG. 4.2. The data integrity coded chunks (412) may include any number of chunks. Each chunk may correspond to a portion of data generated by a data integrity scheme such as, for example, erasure coding or other type of scheme. For example, any number of chunks may be generated when an erasure coding algorithm is performed on any quantity of data. The quantity of data may include data (420) from a system (e.g., file system or other type of data organization scheme) and/or system metadata (422). When performing the algorithm, data integrity information (424) may be generated. The data integrity information (424) may be, for example, parity chunks that enable a portion of the chunks to be regenerated when the chunks are lost due to, for example, failure of a persistent storage.

Returning to FIG. 4.1, the object level metadata (414) may be a data structure that includes metadata associated with any number of the chunks of the data integrity coded chunks (412). For example, a portion of the object level metadata (414) may correspond to a number of the chunks that include information regarding a particular object (e.g., a file). The portion of the object level metadata (414) may include, for example, an identifier of an object (e.g., a file name), characteristics of the object, identifiers of chunks of the data integrity coded chunks (412) corresponding to the object, and other types of information associated with the object. The object level metadata (414) may include any number of portions that correspond to any number of objects associated with respective portions of the chunks of the data integrity coded chunks (412).

The chunk level metadata (416) may be a data structure that includes metadata associated with corresponding chunks of the data integrity coded chunks (412). For example, a portion of the chunk level metadata (416) may correspond to a single chunk of the chunks of the data integrity coded chunks (412). The portion of the chunk level metadata (416) may include, for example, an identifier of the single chunk, access information for the single chunk (e.g., an identifier of a storage that stores the single chunk, an identifier of a computing resource aggregation that includes the storage, an identifier of a region that includes the computing resource aggregation, etc.), and/or classification information regarding the single chunk. The classification information may include, for example, information regarding the single chunk such as, for example, whether the single chunk includes information that may be restricted due to jurisdictional regulations (e.g., personal information), access restrictions with respect to the single chunk, and/or other types of information regarding the single chunk. The chunk level metadata (416) may include any number of portions that correspond to any number of chunks. Each of the corresponding chunks may be stored in the example storage (400) or in other storages.

While the example storage (400) has been described as including a limited number of specific components, an example storage (400) in accordance with embodiments of the invention may include additional, fewer, and/or different components without departing from the invention. Further, while the data structures illustrated in FIGS. 4.1-4.2 have been described as being separate and including a limited amount of specific information, the aforementioned data structure may include additional, different, and/or less information, may be stored in other locations, may be distributed across any number of devices, and may be subdivided into any number of data structures stored in any number of locations without departing from the invention.

Returning to FIG. 1, the data storage system (104) may provide data management services for clients. FIGS. 5.1-5.4 illustrates methods that may be performed by the data storage system (104) of the system of FIG. 1 when providing data management services.

FIG. 5.1 shows a flowchart of a method in accordance with one or more embodiments of the invention. The method depicted in FIG. 5.1 may be used to service data access requests in accordance with one or more embodiments of the invention. The method shown in FIG. 5.1 may be performed by, for example, a data storage system (e.g., 104, FIG. 1). Other components of the system illustrated in FIG. 1 may perform all, or a portion, of the method of FIG. 5.1 without departing from the invention.

While FIG. 5.1 is illustrated as a series of steps, any of the steps may be omitted, performed in a different order, additional steps may be included, and/or any or all of the steps may be performed in a parallel and/or partially overlapping manner without departing from the invention.

In step 500, a data access request is obtained. The data access request includes a metadata characteristic.

In one or more embodiments of the invention, the data access request is obtained by a global enumerator. The data access request may be obtained by receiving the request in a message from a client or another type of entity.

In one or more embodiments of the invention, the data access request is request for accessing data stored by the data storage system. For example, the data access request may be a request for all data matching the metadata characteristic included in the data access request.

In one or more embodiments of the invention, the metadata characteristic specifies the characteristic of the metadata. The characteristic of the metadata may match one or more portions of object level metadata and/or chunk level metadata.

For example, the metadata characteristic may specify the computing resource aggregation. In other words, the data access request may be a request for accessing a portion of data stored in the computing resource aggregation.

In one or more embodiments of the invention, the metadata characteristic is multi-dimensional. In other words, the metadata characteristic specifies multiple characteristics. For example, the metadata characteristic may be all data stored in a particular computing resource aggregation that is of a particular classification (e.g., data associated with a particular person).

In step 504, the metadata characteristic is matched to a portion of data chunks based on chunk level metadata and/or object level metadata.

In one or more embodiments of the invention, the metadata characteristic is matched by comparing the metadata characteristic to the chunk level metadata and/or the object level metadata. A match may be determined based on the comparison.

The portion of the data chunks may include any quantity of data chunks. The data chunks may be, for example, data integrity coded chunks (e.g., 412, FIG. 4.1). The portion of the data chunks may, for example, include no chunks, one chunk, two chunks, etc. In other words, the match may indicate that no or any number of chunks are associated with the metadata characteristic.

In one or more embodiments of the invention, the matching is performed by distributing any number of sub-requests to any number of regions of the data storage system. For example, when the data access request is obtained by the global enumerator, a number of sub-requests may be generated based on the data access requests. Each of the sub-requests may be customized for each of the regions. By doing so, sub-requests that consume fewer computing resources than would be required to process the data access request in each region may be distributed to the regions for processing. Consequently, the availability of computing resources in the data storage system may be improved.

In one or more embodiments of the invention, the match is performed via the method illustrated in FIG. 5.2. The match may be performed via other methods without departing from the invention.

In step 506, a response to the data access request that is based on the portion of the data chunks is provided in response to the request.

In one or more embodiments of the invention, the response includes a portion of the data chunks.

In one or more embodiments of the invention, the response includes information based on the portion of the data chunks. For example, the response may specify that responsive data is stored in the data storage system without providing the responsive data (i.e., the portion of the data chunks).

In one or more embodiments of the invention, the response includes metadata associated with portion of the data chunks. For example, the response may include information based on object level metadata and/or chunk level metadata associated with all, or a portion, of the portion of the data chunks.

The method may end following step 506.

As noted above, a method illustrated in FIG. 5.2 may be performed to match the metadata to a portion of the data. FIG. 5.2 shows a flowchart of a method in accordance with one or more embodiments of the invention. The method depicted in FIG. 5.2 may be used to match metadata to a portion of the data in accordance with one or more embodiments of the invention. The method shown in FIG. 5.2 may be performed by, for example, a data storage system (e.g., 104, FIG. 1). Other components of the system illustrated in FIG. 1 may perform all, or a portion, of the method of FIG. 5.2 without departing from the invention.

While FIG. 5.2 is illustrated as a series of steps, any of the steps may be omitted, performed in a different order, additional steps may be included, and/or any or all of the steps may be performed in a parallel and/or partially overlapping manner without departing from the invention.

In step 510, a portion of regions that each store at least one data chunk of the portion of the data chunks is identified.

In one or more embodiments of the invention, the portion of the regions is identified by matching a dimension of the metadata characteristic of step 500 of FIG. 5.1 to an identifier of a computing resource aggregation and/or region. For example, as discussed above, the metadata characteristic may specify storage locations and/or regions (e.g., when information regarding data from a particular location/region is desired). The portion of the regions may be identified by matching the identifiers specified by the metadata characteristic to corresponding regions of the portion of the regions. To do so, object level metadata may be searched to identify the matching regions.

In step 512, sub-requests for respective regions of the portion of the regions are generated based on the data access request.

The sub-requests for the respective regions may be generated by limiting the number of dimensions of the metadata characteristic specified by the data access request to metadata characteristics that are relevant for each of the respective regions. For example, if a data access request specifies a metadata characteristic that indicates that only a computing resource aggregation in a single region is likely to include responsive data (e.g., by specifying that only the data in the computing resource aggregation is to be considered when formulating a response to the data access request by including, for example, an identifier of the computing resource aggregation in the metadata characteristic), only a sub-request for the region that includes the computing resource aggregation may be generated.

In step 514, the sub-requests are distributed to regional enumerators in respective regions of the portion of the regions.

In one or more embodiments of the invention, the sub-requests are distributed by sending copies of the sub-requests to the regional enumerators via corresponding messages.

In step 516, responses to the sub-requests are aggregated. The responses may include, for example, information regarding data included in each of the regions that may be responsive to the data access request and/or the responsive data. The aggregated responses may be used to generate the response to the data access request.

The method may end following step 516.

The methods illustrated in FIGS. 5.1-5.2 may be performed, for example, by a global enumerator. In some embodiments of the invention, the methods performed in FIGS. 5.1-5.2 may be performed by an instance of a regional enumerator that is acting as both a regional enumerator and a global enumerator. By performing the methods illustrated in FIGS. 5.1-5.2, a system in accordance with embodiments of the invention may efficiently respond to data access requests by utilizing object level metadata and/or chunk level metadata to generate responses to data access requests rather than by crawling data or employing more computationally expensive methods of generating responses to data access requests.

As discussed above, sub-requests may be responded to by regional enumerators. FIG. 5.3 shows a flowchart of a method in accordance with one or more embodiments of the invention. The method depicted in FIG. 5.3 may be used to respond to a sub-request in accordance with one or more embodiments of the invention. The method shown in FIG. 5.3 may be performed by, for example, a data storage system (e.g., 104, FIG. 1). Other components of the system illustrated in FIG. 1 may perform all, or a portion, of the method of FIG. 5.3 without departing from the invention.

While FIG. 5.3 is illustrated as a series of steps, any of the steps may be omitted, performed in a different order, additional steps may be included, and/or any or all of the steps may be performed in a parallel and/or partially overlapping manner without departing from the invention.

In step 520, a sub-request is obtained.

In one or more embodiments of the invention, the sub-request is obtained from a global enumerator. The sub-request may specify one or more metadata characteristics. The one or more metadata characteristics may correspond to, for example, information that is included in object level metadata and/or chunk level metadata.

In step 522, copies of the sub-request are distributed to a portion of the storages in a region. The portion of the storages may include data that is likely to be responsive to the sub-request.

To identify the portion of the storages, object level metadata and/or chunk level metadata may be matched to one or more of the metadata characteristics. The sub-requests may be distributed to only the storages corresponding to the matched object level metadata and/or chunk level metadata. By doing so, only a subset of all of the storages in a region may receive sub-requests. Consequently, only storages that are likely to include responsive data may be encumbered with processing of the sub-requests.

For example, the regional enumerator of each region may have access to a cached (i.e., in memory data structure) version of object level metadata for all data chunks in a region. The metadata characteristics may be matched to the object level metadata to determine whether any of the data chunks in each of the storages is likely to be responsive to a sub-request. Sub-requests may be distributed to each of the regions corresponding to the matched metadata.

In step 524, the responses to the copies of the sub-requests are aggregated. For example, each storage that receives a copy of the sub-request may generate a response based on a match between the metadata characteristic specified by the sub-request and object level metadata and/or chunk level metadata stored in the storage. The storages may respond to the sub-requests based on the matches by including the corresponding data chunks and/or information regarding the data chunks and/or the matched metadata. The responses may be provided to regional enumerators of the corresponding regions.

In step 526, the aggregated responses to the copies of the sub-request are provided in response to the sub-request. For example, the responses may be combined into a single response that includes the information included in each of the responses to the copies of the sub-request. The response may deduplicate information that is duplicative in the responses to the sub-request obtained from the storages.

The method may end following step 526.

The method illustrated in FIG. 5.3 may be performed by regional enumerators. When performing the methods illustrated in FIG. 5.3, the regional enumerators may distribute sub-requests to computing resource aggregations and/or directly to storages included in each of the computing resource aggregations.

For example, in a scenario in which three computing clusters are disposed in a region, a regional enumerator may distribute sub-requests to each of the computing clusters. In turn, the computing clusters may distribute copies of the sub-requests to each of the storages (or storage managers) hosted by the sub-requests. Each of the storages (or storage managers) may independently process the sub-requests in accordance with their individual workloads. By doing so, a data storage system in accordance with embodiments of the invention may provide a distributed method of addressing data access requests across any number of regions. Processing of the sub-requests may be performed asynchronously and, consequently, may be efficiently processed by each of the regions separately from the other regions.

As discussed above, when responding to data access requests, a system in accordance with embodiments of the invention may utilize object level metadata and/or chunk level metadata to generate the response without resorting to crawling of data or other computationally expensive methods of crawling data. FIG. 5.4 shows a flowchart of a method in accordance with one or more embodiments of the invention. The method depicted in FIG. 5.4 may be used to store data in a data storage system in accordance with one or more embodiments of the invention. The method shown in FIG. 5.4 may be performed by, for example, a data storage system (e.g., 104, FIG. 1). Other components of the system illustrated in FIG. 1 may perform all, or a portion, of the method of FIG. 5.4 without departing from the invention.

While FIG. 5.4 is illustrated as a series of steps, any of the steps may be omitted, performed in a different order, additional steps may be included, and/or any or all of the steps may be performed in a parallel and/or partially overlapping manner without departing from the invention.

In step 530, data is obtained for storage.

In one or more embodiments of the invention, the data is obtained from a client. The data may include any quantity and/or type of data. For example, the data may include data (e.g., an object) corresponding to an object and metadata used by a file system for organization purposes.

In one or more embodiments of the invention, the data may be provided to the data storage system by a client. For example, the data may be sent to the data storage system from the client via an operable connection between the data storage system and the client.

In step 532, an object of the data is data integrity coded to obtain data chunks corresponding to the object. The data chunks may be data integrity coded data.

For example, the data may be integrity coded by erasure coding the data. Other types of data integrity algorithms may be used to encode the data without departing from the invention.

In one or more embodiments of the invention, the object of the data is a logical portion of data. For example, the logical portion of the data may correspond to a portion specified by an organization framework (e.g., a file system) used by a client to store the object prior to providing the data to the data storage system for storage.

In step 534, object level metadata for the object is obtained. The object level metadata may include information regarding the object. For example, the object level metadata may be derived from system-level metadata associated with the object. The object level metadata may also include other information regarding the object beyond that of system-level metadata. For example, the object level metadata may include classification information, access restrictions, and/or other information that may be utilized to restrict and/or control access to the object. Such information may be obtained via any method without departing from the invention.

In step 536, chunk level metadata for each of the data chunks is obtained. The chunk level metadata may include information regarding a corresponding data chunk. The chunk level metadata may include information derived from system-level metadata associated with an object that includes the data of the data chunk. The chunk level metadata may also include, for example, classification information regarding jurisdictional data access regulations, personal information, data access restrictions, and/or any other type of information that may be useful to discriminate the data chunk from other data chunks.

When generating the object level metadata and/or chunk level metadata, any type of algorithm may be used to data mine the corresponding data for relevant information regarding the metadata that should be generated for each of the data chunks. For example, algorithms designed to detect the presence of personal information (or other types of information that may be subject to data access/control restrictions) or other information that implicates that special precautions must be taken to manage the data included in the data chunks and/or objects. The metadata (i.e., object level and/or chunk level) may include relevant information based on such analysis of the data.

In step 538, the data chunks, the object level metadata, and the chunk level metadata is stored. For example, the data chunks may be distributed across any number of storage devices in accordance with fault domain restrictions imposed by a data integrity algorithm used to encode the data to obtain the data chunks. The object level metadata and/or the chunk level metadata may be stored along with the data chunks and/or in other locations. For example, the metadata may be stored separately from the data to improve the searchability of the metadata.

Any number of copies of the data chunks and metadata may be stored in any number of locations without departing from the invention. For example, copies of the metadata may be stored in a regional-level (i.e., in a repository reflecting all metadata of a region), in a computing resources aggregation level, and/or at a storage level. In contrast, copies of the data chunks may only be stored at a storage level.

By doing so, the metadata may be stored in a highly searchable manner that facilitates computational efficient searching of the metadata at different levels of granularity while copies of the data chunks may be stored in a reliable level at a storage level.

The method may end following step 538.

Thus, via the method illustrated in FIG. 5.4, metadata may be generated and/or stored in a manner that facilitates efficient searching of the data chunks. Further, because the data chunks are stored in a form that includes data integrity information, the data included in the data chunks may not be stored in an easily searchable form via direct searching of the data included in the data chunks.

To further clarify embodiments of the invention, a non-limiting example is provided in FIGS. 6.1-6.4. Each of these figures may illustrate a system similar to that of FIG. 1 at different points in times. For the sake of brevity, only a limited number of components of the system of FIG. 1 are illustrated in each of FIGS. 6.1-6.4.

Example

Consider a scenario as illustrated in FIG. 6.1 in which a client (600) desires to obtain information regarding data stored in a data storage system (610). The data storage system (610) may include a first region (620) and a second region (630).

To service data access requests from clients, the first region (620) may include a first regional enumerator (622) that manages searching of data stored in a first cluster (624) and a second cluster (626). Similarly, the second region (630) may include a second regional enumerator (632) that manages searching of data stored in a third cluster (634) and a fourth cluster (636). Each of the clusters (e.g., 624, 626, 634, 636) may include any number of computing accelerated storage devices that store data that may be relevant to clients.

The clusters in the first region (620) may store data regarding customer service requests from customers of a computer supply company. For example, the first cluster (624) may store records regarding service calls to clients located in Atlanta, Ga., and the second cluster (626) may store records regarding service calls to clients located in Seattle, Wash. For data redundancy, copies of the data stored in the first cluster (624) may be replicated to the third cluster (634) and the fourth cluster (636), resulting in three copies of the data being redundantly stored. The data stored in each of the clusters is stored in accordance with embodiments of the invention discussed above resulting in both object level and chunk level metadata for the data being generated and stored.

At a first point in time, the client (600) sends a data access request (602) to the first regional enumerator (622) requesting information regarding a customer from Atlanta, Ga. Specifically, the data access requests (602) is a request for any data related to Michael Brooks, the president of Acme Plumbing, a long-time customer of the computer supply company.

In response to receiving the data access request (602), the first regional enumerator (622) determines that the metadata criteria (i.e., data from the Atlanta region associated with the first cluster and personal information associated with the president of Acme Plumbing) indicates that copies of the relevant data are likely stored in the first cluster (624), the third cluster (634), and the fourth cluster (636). The determination is made based on object level and chunk level metadata, as discussed above.

In response to making the determination, the first regional enumerator (622) generates and sends a sub-request (604) to the second regional enumerator (632). Because the first regional enumerator (622) is operating as a global enumerator, an additional sub-request for the first regional enumerator (622) is not generated because the first regional enumerator (622) already has access to and will process the data access requests (602) for regional purposes.

After the sub-request is received by the second regional enumerator (632), corresponding copies of the sub-request (604, 606) are forwarded to the clusters (e.g., 624, 634, 636) that likely include relevant information as specified by the object level and/or chunk level metadata, as illustrated in FIG. 6.2. The copies of the sub-requests each include a copy of the metadata criteria (i.e., company name and name of the president) used to determine data that may be relevant to the data access requests.

In response to receiving the copies of the sub-requests, the first cluster (624), the third cluster (634), and the fourth cluster (636) generate corresponding responses (607, 608, 609) as illustrated in FIG. 6.3. The responses are generated by matching the metadata criteria included in the copies of the sub-requests to object level and/or chunk level metadata. The responses may include copies of the data chunks associated with matching object level and/or chunk level metadata. For example, each of these clusters may include service records that specify that services were performed for Acme Plumbing and that Michael Brooks authorized performance of the services.

To generate the responses, each of the storages of the clusters (624, 634, 636) may separately match the metadata criteria to object and/or chunk level metadata, obtain copies of the corresponding data chunks, and generate the responses based on the copies of the corresponding data chunks and/or matched metadata.

Once the responses are received by the first regional enumerator (622) (that is acting as a global enumerator), the first regional enumerator (622) may generate and provide an aggregated response (640) to the client (600). The aggregated response may include the responses obtained from the respective clusters.

End of Example

Thus, via the method illustrated in FIGS. 6.1-6.4, embodiments of the invention may provide a method for efficiently searching data stored in a data storage system that spans any number of regions. By doing so, large amounts of data may be searching in a computationally efficient manner while the underlying data may not be stored in an efficiently searchable format.

Figure 7:
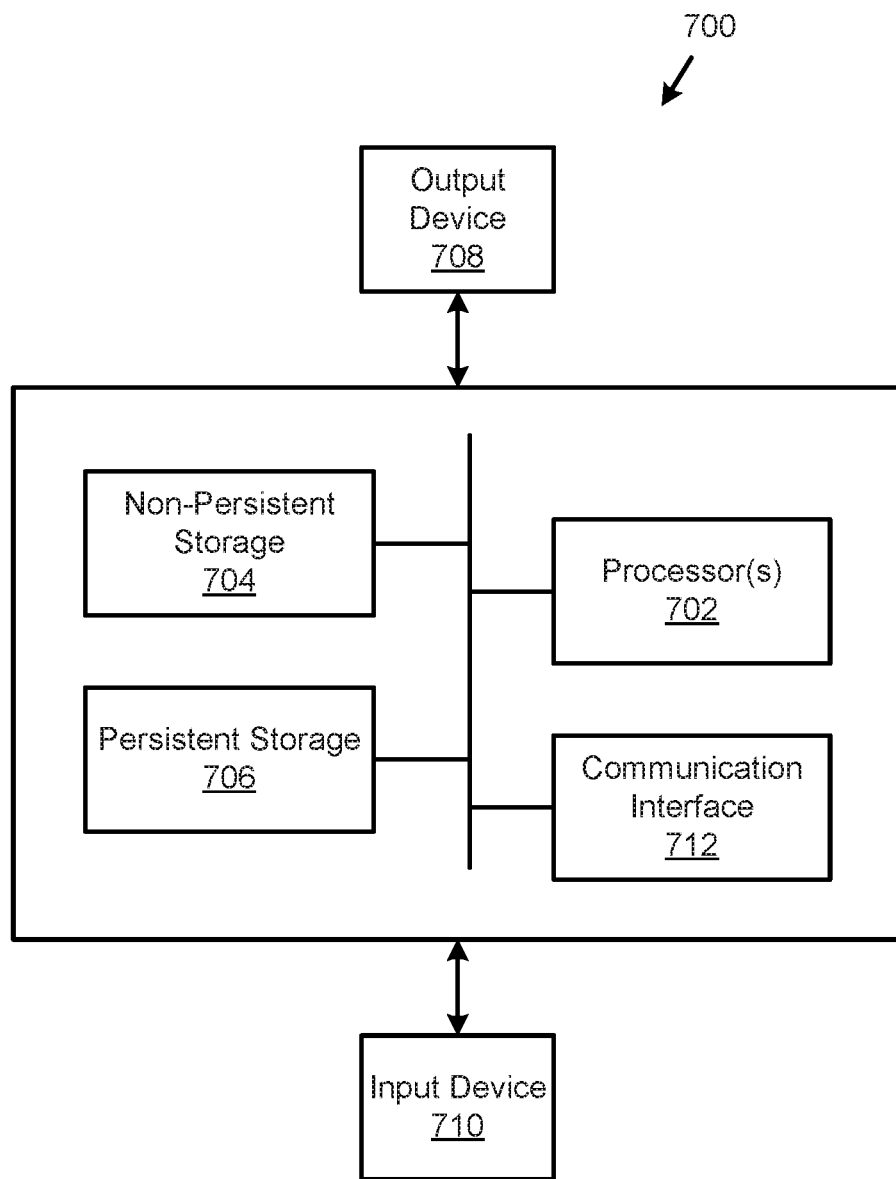
FIG. 7 shows a diagram of a computing device in accordance with one or more embodiments of the invention.

As discussed above, embodiments of the invention may be implemented using computing devices. FIG. 7 shows a diagram of a computing device in accordance with one or more embodiments of the invention. The computing device (700) may include one or more computer processors (702), non-persistent storage (704) (e.g., volatile memory, such as random access memory (RAM), cache memory), persistent storage (706) (e.g., a hard disk, an optical drive such as a compact disk (CD) drive or digital versatile disk (DVD) drive, a flash memory, etc.), a communication interface (712) (e.g., Bluetooth interface, infrared interface, network interface, optical interface, etc.), input devices (710), output devices (708), and numerous other elements (not shown) and functionalities. Each of these components is described below.

In one embodiment of the invention, the computer processor(s) (702) may be an integrated circuit for processing instructions. For example, the computer processor(s) may be one or more cores or micro-cores of a processor. The computing device (700) may also include one or more input devices (710), such as a touchscreen, keyboard, mouse, microphone, touchpad, electronic pen, or any other type of input device. Further, the communication interface (712) may include an integrated circuit for connecting the computing device (700) to a network (not shown) (e.g., a local area network (LAN), a wide area network (WAN) such as the Internet, mobile network, or any other type of network) and/or to another device, such as another computing device.

In one embodiment of the invention, the computing device (700) may include one or more output devices (708), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (702), non-persistent storage (704), and persistent storage (706). Many different types of computing devices exist, and the aforementioned input and output device(s) may take other forms.

Embodiments of the invention may provide a computationally efficient method for searching data stored across any number of regions. The data may be natively stored in any number of organizational methods (i.e., different types of file system) that are not easily searchable together. Embodiments of the invention may facilitate computationally efficient searching of such information by preprocessing the information, at the time of storage, to identify particular characteristics of the underlying data. The identified characteristics may be stored as object level metadata and/or chunk level metadata to facilitate both macro and granular searching of the data based on the particular characteristics of the underlying data.

Thus, embodiments of the invention may address the problem of limited computational resource availability by decreasing the computational cost for searching data. By preprocessing the data, embodiments of the invention may facilitate computationally efficient searching of the data.

The problems discussed above should be understood as being examples of problems solved by embodiments of the invention disclosed herein and the invention should not be limited to solving the same/similar problems. The disclosed invention is broadly applicable to address a range of problems beyond those discussed herein.

One or more embodiments of the invention may be implemented using instructions executed by one or more processors of the data management device. Further, such instructions may correspond to computer readable instructions that are stored on one or more non-transitory computer readable mediums.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A data storage system, comprising:
    storage for storing:
       data chunks,
       object level metadata associated with portions of the data chunks, and
       chunk level metadata associated with respective data chunks; and
    a global enumerator programmed to:
       obtain a data access request comprising a metadata characteristic;
       in response to obtaining the data access request:
          match the metadata characteristic to at least one of the data chunks based on at least one selected from a group consisting of the object level metadata and the chunk level metadata; and
          provide a response, based on the at least one data chunk of the data chunks, in response to the data access request; and
    a plurality of regional enumerators associated with respective regions that store respective portions of the data chunks,
    wherein matching the metadata characteristic to the at least one of the data chunks comprises:
       identifying a portion of the regions in which respective portions of the data chunks are stored that include the at least one of the data chunks;
       generating a plurality of sub-requests, based on the data access request, for respective regions of the portion of the regions;
       distributing the sub-requests to a portion of the plurality of the regional enumerators based on the portion of the regions; and
       aggregating responses to the sub-requests from the portion of the plurality of the regional enumerators.

2. The data storage system of claim 1, wherein the data chunks comprise data integrity coded data.

3. The data storage system of claim 2, wherein the data comprises system data from a client for which the data storage system provides data storage services.

4. The data storage system of claim 1, wherein the storage comprises:
    a first plurality of storage devices disposed in a first region;
    a second plurality of storage devices disposed in a second region;
    wherein the first region is geographically separated from the second region.

5. The data storage system of claim 4, wherein a first portion of the first plurality of storage devices are housed in a first cluster and a second portion of the first plurality of storage devices are housed in a second cluster.

6. The data storage system of claim 1, wherein the object level metadata comprises:
    object identifiers associated with data of respective portions of the data chunks.

7. The data storage system of claim 6, wherein the object level metadata is based on system metadata associated with data associated with the data chunks.

8. The data storage system of claim 1, wherein the object level metadata comprises:
    data integrity scheme identifiers associated with data integrity schemes used to encode data to obtain the data chunks.

9. The data storage system of claim 1, wherein the chunk level metadata comprises:
    data integrity scheme identifiers associated with respective data chunks, wherein the data integrity scheme identifiers are associated data integrity schemes used to encode data to obtain the respective data chunks.

10. The data storage system of claim 1, wherein the chunk level metadata comprises:
    storage device identifiers, associated with the respective data chunks, of devices in which the respective data chunks are stored.

11. The data storage system of claim 1, wherein the chunk level metadata comprises:
    classification identifiers, associated with respective data chunks, that specify a characteristic of the respective data chunks.

12. The data storage system of claim 1, wherein matching the metadata characteristic to the at least one of the data chunks is performed without crawling the data chunks.

13. A method for managing a data storage system, comprising:
    obtaining a data access request comprising a metadata characteristic;
    in response to obtaining the data access request:
       matching the metadata characteristic to at least one data chunk of data chunks managed by the data storage system based on at least one selected from a group consisting of object level metadata and chunk level metadata; and
       providing a response, based on the at least one data chunk of the data chunks, in response to the data access request, wherein matching the metadata characteristic to the at least one of the data chunks comprises:
  identifying a portion of regions in which respective portions of the data chunks are stored that include the at least one of the data chunks;
  generating a plurality of sub-requests, based on the data access request, for respective regions of the portion of the regions;
  distributing the sub-requests to a portion of a plurality of regional enumerators based on the portion of the regions; and
  aggregating responses to the sub-requests from the portion of the plurality of the regional enumerators.

14. The method of claim 13, wherein the data chunks comprise data integrity coded data.

15. The method of claim 14, wherein the data comprises system data from a client for which the data storage system provides data storage services.

16. A non-transitory computer readable medium comprising computer readable program code, which when executed by a computer processor enables the computer processor to perform a method for managing a data storage system, the method comprising:
  obtaining a data access request comprising a metadata characteristic;
  in response to obtaining the data access request:
    matching the metadata characteristic to at least one data chunk of data chunks managed by the data storage system based on at least one selected from a group consisting of object level metadata and chunk level metadata; and
    providing a response, based on the at least one data chunk of the data chunks, in response to the data access request,
  wherein matching the metadata characteristic to the at least one of the data chunks comprises:
    identifying a portion of regions in which respective portions of the data chunks are stored that include the at least one of the data chunks;
    generating a plurality of sub-requests, based on the data access request, for respective regions of the portion of the regions;
    distributing the sub-requests to a portion of a plurality of regional enumerators based on the portion of the regions; and
    aggregating responses to the sub-requests from the portion of the plurality of the regional enumerators.

17. The non-transitory computer readable medium of claim 16, wherein the data chunks comprise data integrity coded data.

* * * * *